United States Patent [19]
Weiss

[11] 4,424,870
[45] Jan. 10, 1984

[54] ATTACHMENT DEVICE FOR THE FRONT OF A MOTOR VEHICLE

[75] Inventor: Heinz Weiss, Bensheim, Fed. Rep. of Germany

[73] Assignee: Deere & Company, Moline, Ill.

[21] Appl. No.: 366,734

[22] Filed: Apr. 8, 1982

[30] Foreign Application Priority Data

Apr. 22, 1981 [EP] European Pat. Off. ......... 81103031.1

[51] Int. Cl.³ .................. A01B 63/108; A01B 59/048
[52] U.S. Cl. ................................ 172/810; 172/439; 280/461 A; 280/497
[58] Field of Search ............... 172/439, 810, 817; 280/461 A, 496, 497

[56] References Cited

U.S. PATENT DOCUMENTS

| | | | |
|---|---|---|---|
| 2,565,337 | 8/1951 | Allan | 172/817 |
| 2,608,924 | 9/1952 | Bywater | 172/439 X |
| 2,722,066 | 11/1955 | Wills | 172/817 |
| 3,145,781 | 8/1964 | Rogler | 172/810 |
| 3,800,879 | 4/1974 | Chant | 172/810 |
| 3,944,000 | 3/1976 | van der Lely | 172/439 |
| 4,124,079 | 11/1978 | Crow | 172/810 |
| 4,164,985 | 8/1979 | Bobard | 280/461 A |
| 4,194,756 | 3/1980 | van der Lely | 172/439 |

FOREIGN PATENT DOCUMENTS

| | | |
|---|---|---|
| 2758978 | 7/1979 | Fed. Rep. of Germany . |
| 2852773 | 6/1980 | Fed. Rep. of Germany . |
| 99264 | 11/1961 | Norway ............................. 172/817 |

Primary Examiner—Richard J. Johnson

[57] ABSTRACT

An attachment device is shown for mounting an implement onto the front of a motor vehicle. The attachment device is substantially contained within the hood portion of the vehicle and includes a pair of vertically aligned support members fastened to the frame of the vehicle. A first pair of swinging arms are pivotally attached to the support members and extend forward thereof to merge into a single pivot point. A second pair of swinging arms are also pivotally attached to the support members, below the points of attachment of the first pair of swinging arms and in a parallel fashion thereto. The forward ends of the first and second pair of swinging arms support an adjustable implement. The swinging arms are vertically adjustable by a pair of lifting means, such as hydraulic cylinders, which are pivotally attached at a lower end to the frame of the vehicle and are rotatably attached at their upper ends to the first pair of swinging arms. By extending and retracting the hydraulic cylinders, the swinging arms can raise and lower the attached implement relative to the ground.

16 Claims, 10 Drawing Figures

ATTACHMENT DEVICE FOR THE FRONT OF A MOTOR VEHICLE

FIELD OF THE INVENTION

This invention relates to an attachment device for the front of a motor vehicle and particulary to an attachment device capable of adjusting the height of an implement mounted to the front of an agricultural or industrial vehicle.

BACKGROUND OF THE INVENTION

Currently, on agricultural and industrial type vehicles, development is proceeding in the direction of using larger, wider and heavier add-on implements. These implements are being added to both the front and rear of the vehicle. For rear mounted implements, it is possible to design them in such a manner that if they are accessibly wide, they can be folded to the rear or alternatively upward during the transport phase. In the case of corresponding large implements mounted to the front of a tractor, it is generally impossible to fold them either traversely or upwardly. The reasons being that if they are folded traversely, they cause a change in weight distribution of the tractor which can affect steering, and if they are folded upwards, they can restrict the drivers view in an impermissible manner.

For front mounted implements in particular, there is also a need to be able to vertically raise the attached implement to a sufficient height to place it on a flatbed truck. It is also desirable for the operator to be able to load or unload the implement onto or off of a truck by himself and to be able to couple and/or uncouple the implement without danger. Furthermore, in order to be able to raise an implement a sufficient height to place it on a truck for transport purposes, it is commonly necessary to move the implement vertically without swinging it horizontally to an appreciable extent. Such is particularly true for hopper-type seed drills, fertilizer-spreaders and spraying appliances in the working position. And lastly, there is a general desire to position a significant portion of the attachment device inside the casing or hood of the vehicle. By so doing, the attachment device is protected from dirt, the appearance of the vehicle is enhanced and the visibility of the operator is improved.

Various front mounted types of implement attachment devices are known, such as taught in German Pat. Nos. 2,758,978 and 2,852,773, and in a U.S. Ser. No. 446,934 filed Dec. 6, 1982, entitled "A VEHICLE-MOUNTED APPARATUS FOR SUPPORTING BALLAST WEIGHTS AND FOR ELEVATING THE WEIGHTS". FIGS. 1 and 2 of German Pat. No. 2,758,978 show a three-point hitch attached to the front of a tractor having limited height adjustment means. The remaining two references show hydraulic cylinders used to actuate the vertical movement of a coupling plate, as well as means for locking the coupling plate in a set position. None of the prior art references disclose the use of an attachment device as taught herein.

Now a front mounted implement attachment device has been invented which can meet the current desires of the industry.

SUMMARY OF THE INVENTION

Briefly, this invention relates to an attachment device for mounting an implement onto the front of a motor vehicle. The implement attachment device includes a pair of spaced apart support members fastened in a vertical fashion to the vehicle frame and aligned parallel to each other. An upper pair of swinging arms, which are joined together at a forward end, are pivotally attached at their rearward ends to the support members. A lower pair of swinging arms aligned approximately parallel to the upper pair of swinging arms are also attached at their rearward end to the support members. The upper and lower pair of swinging arms extend forward beyond the front of the vehicle to support an attachable member, for example, a ground-engaging implement. The attachment device also includes a pair of hydraulic cylinders which are pivotally attached to the vehicle frame at one end and are rotatably attached at an upper end to the upper swinging arms. Movement of the hydraulic cylinders cause the upper and lower swinging arms to move in a parallel fashion since the forward ends of the arms are attached to the implement. This particular attachment device is beneficial in raising the attached implement to a sufficient height so that it can be loaded onto and off of a transport vehicle.

The general object of this invention is to provide an attachment device for a motor vehicle which can adjust the height of a coupled implement relative to the front of the vehicle. A more specific object of this invention is to provide an attachment device for the front of a motor vehicle which is substantially enclosed within the vehicle's casing.

Another object of this invention is to provide an attachment device which can obtain a maximum height such that the coupled implement can be placed on a load platform such as a flatbed truck.

Still further, an object of this invention is to provide an attachment device for the front of an agricultural tractor which is simple and economical to build.

Other objects and advantages of the present invention will become more apparent to those skilled in the art in view of the following description and the accompanying drawings.

DETAILED DESCRIPTION OF THE PREFERRED EMBODIMENTS

Figure 1:
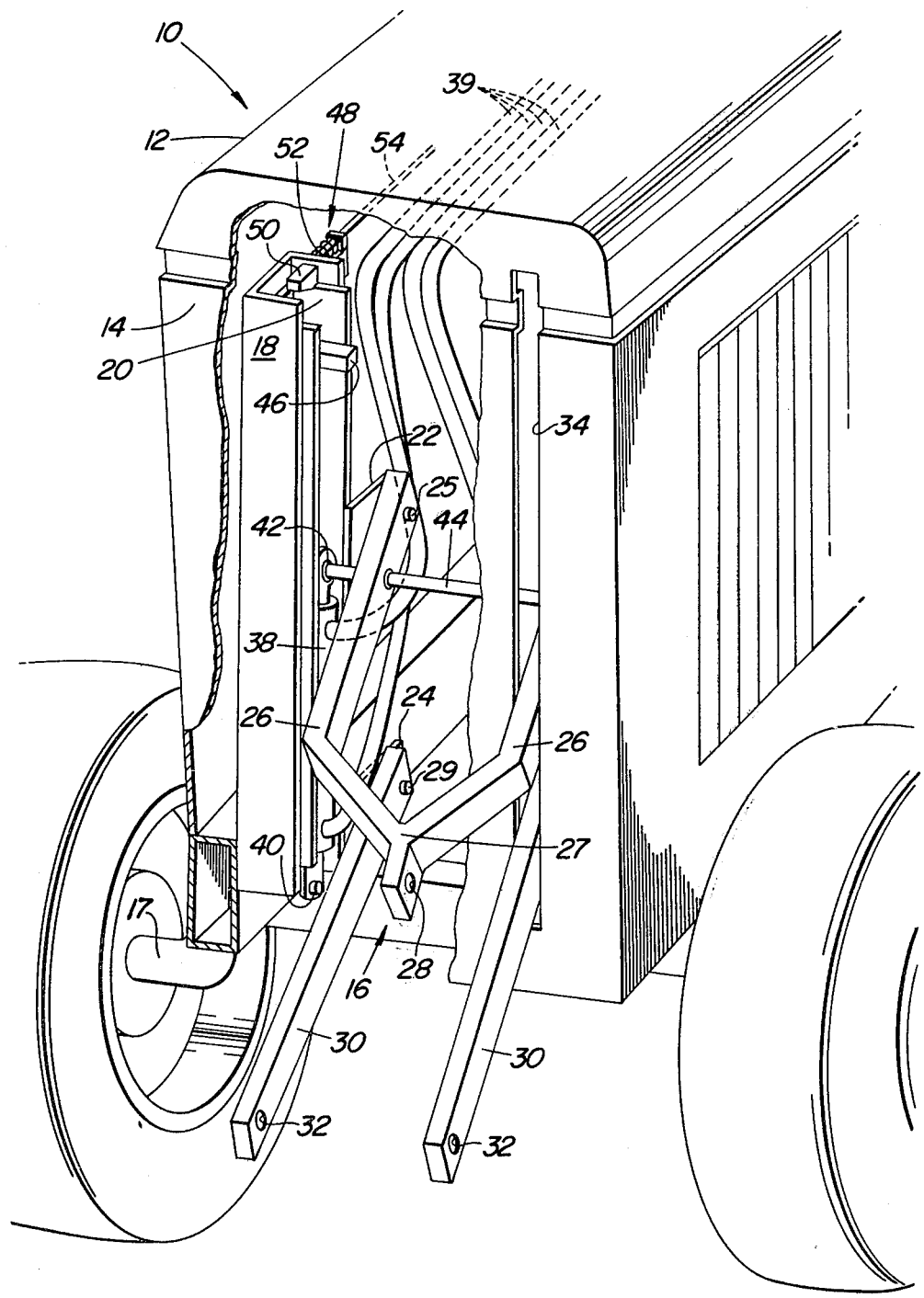
FIG. 1 is a perspective view of the front of a vehicle showing the attachment device mounted thereto.
Figure 2:
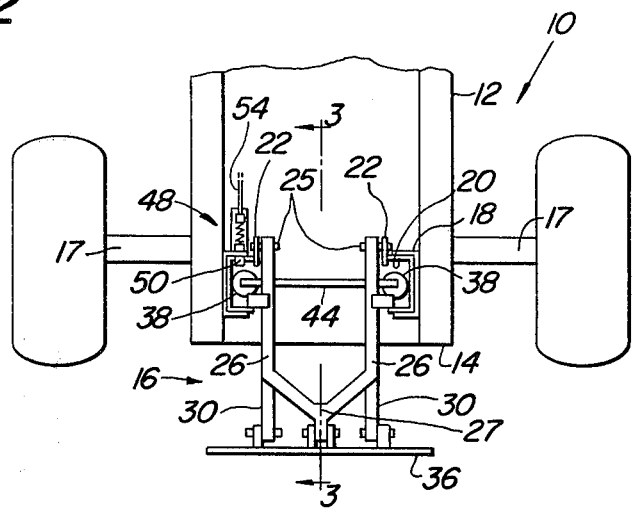
FIG. 2 is a top view of FIG. 1 showing one embodiment of the attachment device with the hydraulic lines removed for the purpose of clarity.

Referring now to FIGS. 1–6, a vehicle 10 is partially shown having a hood or casing 12 which terminates at a front panel 14. An attachment device 16 is mounted to the front of the vehicle 10, forward of a pair of front axles 17, such that a substantial portion of the attachment device 16 is enclosed within the hood 12. The attachment device 16 includes a pair of guide tracks 18, preferably U-shaped, which are fastened to the frame of the vehicle 10. Movably positioned within each of the guide tracks 18 are support members 20, preferably U-shaped beams, which are aligned parallel to each other and are arranged such that the opened portions of the U's face each other.

A pair of first and second rearwardly extending brackets 22 and 24 are fastened, such as by welding, to an inner edge of the support members 20. The first pair of brackets 22 are arranged such as to be vertically above and spaced apart from the second pair of brackets 24. Pivotally attached at points 25 to the first pair of brackets 22 are a pair of first or upper swinging arms 26 which are joined together at a forward end so as to merge into a single tongue 27. It should be noted however that a single upper link can be ultilized instead of the wishbone shaped upper swinging arms 26. The tongue 27 is preferably on the centerline extending between the first pair of swinging arms 26 and has an aperture 28 formed therein. Pivotally attached at points 29 to the second pair of brackets 24 are a pair of second or lower swinging arms 30 which lie parallel to the elongated axis of the vehicle 10 and approximately parallel to the first pair of swinging arms 26. The second pair of swinging arms 30 are connected to the brackets 24 at points 29 so as to be in the vicinity of the front axles 17. Each of the second pair of swinging arms 30 contains an aperture 32 approximate their forward ends.

The first and second pair of swinging arms, 26 and 30 respectively, extend through slots 34 formed in the front panel 14 of the vehicle 10, see FIG. 1. The forward ends of the first and second pairs of swinging arms, 26 and 30, are pivotally connected by fasteners, such as bolts, to a coupling frame 36, see FIGS. 2–6, so as to permit parallel alignment of the first and second pairs of swinging arms 26 and 30 at all times. The coupling frame 36 can support various types of ground-engaging or material moving implements and raise and lower such an implement in a parallel manner. For example, the coupler frame 36 can have an earth-moving bucket attached to it, a lift fork mechanism, a spraying apparatus, etc. It should be noted that an implement can be attached directly to the forward ends of the first and second pairs of swinging arms 26 and 30 if one did not wish to use the coupling frame 36.

The attachment device 16 also includes a pair of lifting elements 38, for example hydraulic cylinders, or any other lifting mechanisms well-known to those skilled in the art. When the lifting elements 38 are hydraulic cylinders, it should be mentioned that either single or multiple stage hydraulic cylinders can be used. Multiple stage hydraulic cylinders are depicted in FIGS. 1–6 and single stage hydraulic cylinders are depicted in FIGS. 7–10. The hydraulic cylinders are connected by hydraulic lines 39 to a control means 41 which is manually operated by a control lever 43, see FIGS. 3–6. Preferably, the control lever 43 is located in the cab of the vehicle 10. When hydraulic cylinders are used as lifting elements 38, they are pivotally attached at their lower ends 40 to a portion of the vehicle frame. Upper ends 42 of the hydraulic cylinders are connected together by a horizontal connecting rod 44 to ensure that both hydraulic cylinders move in unison. The connecting rod 44 is rotatably connected to the first pair of swinging arms 26, forward of the points 25 where the swinging arms 26 are pivotally connected to the brackets 24. It should also be noted that if desired, the upper ends 42 of the hydraulic cylinders can be rotatably attached directly to the first pair of swinging arms 26 thereby eliminating the need for the connecting rod 44. Also, the lifting elements 38 can be connected to the second or lower pair of swinging arms 30.

Figure 3:
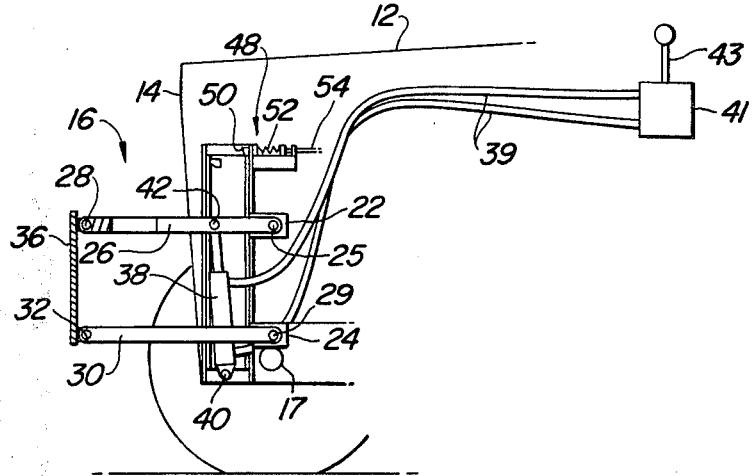
FIG. 3 is a side view taken along the line 3—3 of FIG. 2 showing the swinging arms in a horizontal position and including a control mechanism.
Figure 4:
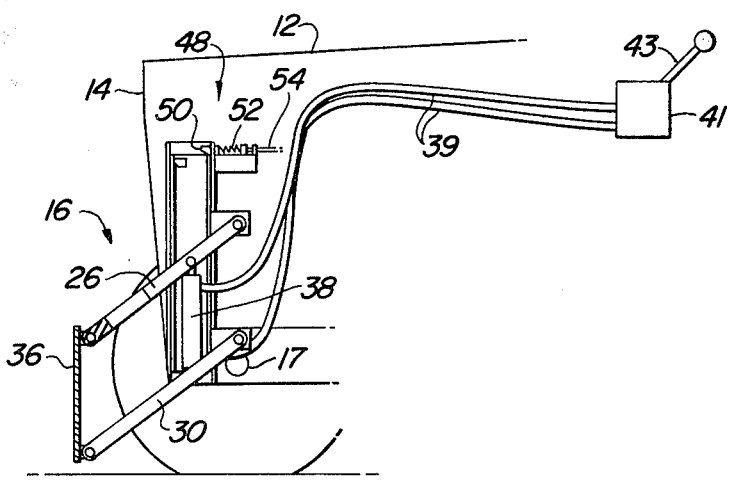
FIG. 4 is a side view similar to FIG. 3 showing the swinging arms in a lowered position.
Figure 5:
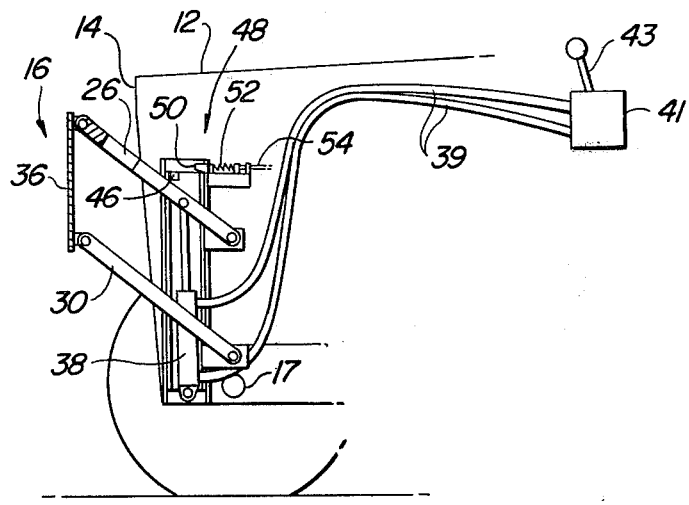
FIG. 5 is a side view similar to FIG. 3 showing the swinging arms in a raised position.
Figure 6:
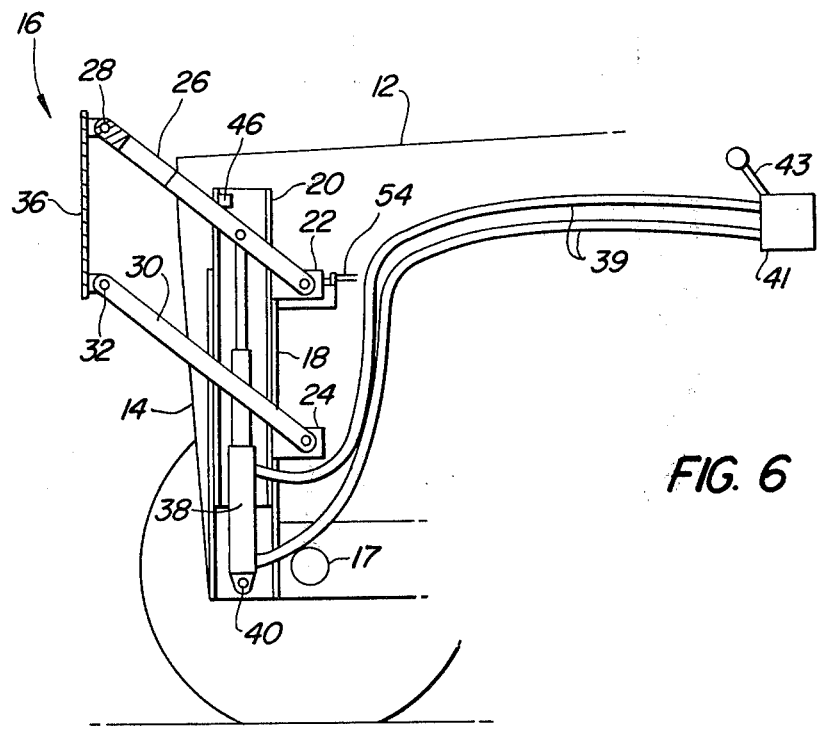
FIG. 6 is an enlarged side view similar to FIG. 3, showing the attachment device in an upmost raised position.
Figure 7:
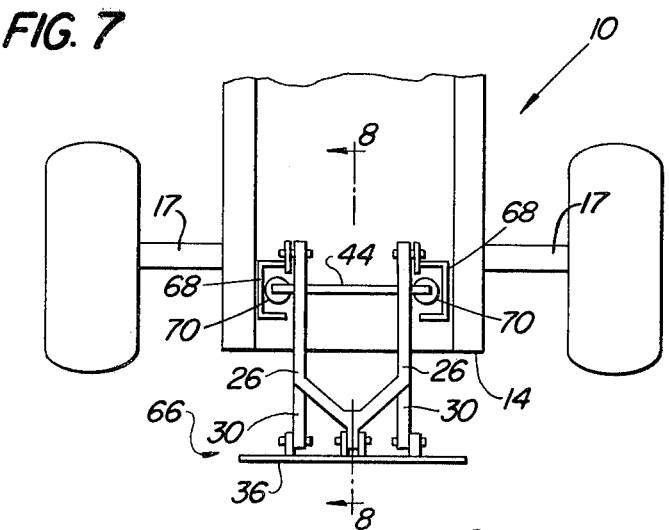
FIG. 7 is a top view of a simplified second embodiment of the attachment device mounted to the front of a vehicle with the hydraulic lines removed for the purpose of clarity.
Figure 8:
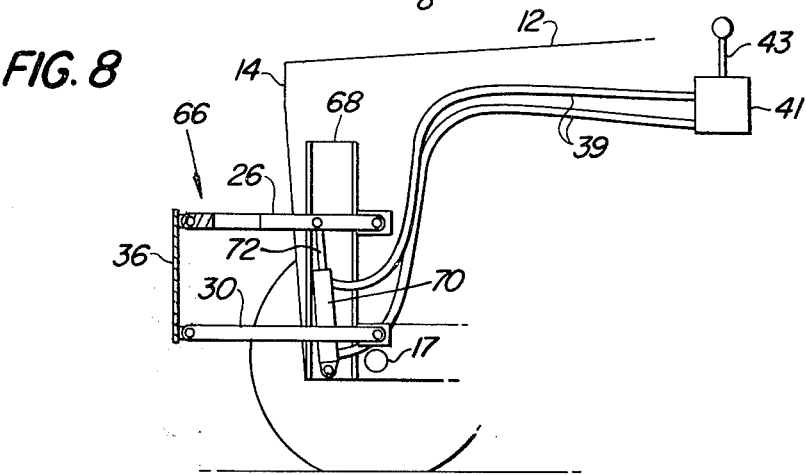
FIG. 8 is a side view taken along the line 8—8 of FIG. 7 showing the swinging arms in a horizontal position and including a control mechanism.
Figure 9:
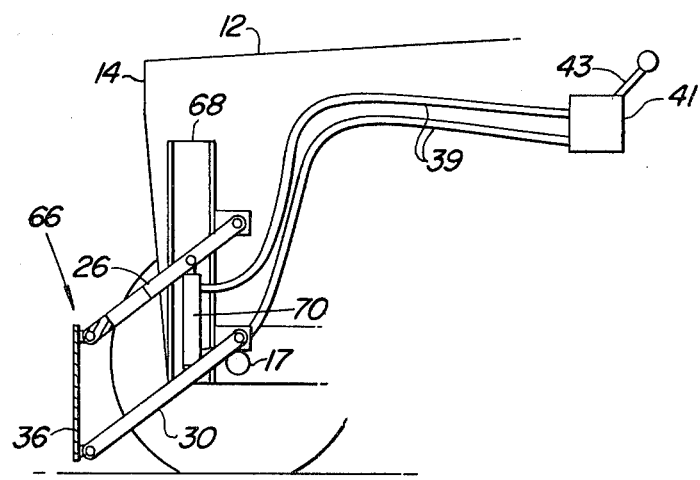
FIG. 9 is a side view similar to FIG. 8 showing the swinging arms in a lowered position.

The first and second pair of swinging arms, 26 and 30 respectively, are aligned approximately horizontal with respect to the ground when the hydraulic cylinders 38 are extended to an intermediate position, see FIG. 3. In order to lower the first and second pairs of swinging arms 26 and 30, the piston rods are retracted into the hydraulic cylinders 38, as indicated in FIG. 4. The limit on the amount the second pair of swinging arms 30 are lowered is dictated by the amount the piston rods of the hydraulic cylinders 38 can retract and by the physical contact of the second pair of swinging arms 30 with the front axles 17. In order to raise the first and second pairs of swinging arms 26 and 30, the piston rodsthe hydraulic cylinders 38 are extended, as shown in FIG. 5. The first pair of swinging arms 26 can be extended by the hydraulic cylinders 38 until they abut a stop member 46. The stop member 46 is fastened to an inner surface of at least one of the support members 20, see FIG. 5. When this point is reached, the first pair of swinging arms 26 will be in contact with the stop member 46 and further upward movement of the piston rod within the hydraulic cylinders 38 will cause the support members 20 to slide upward within the guide tracks 18, see FIG. 6. The ability of the support members 20 to slide upward within the guide tracks 18 enables the attachment means 16 to reach substantial heights while the first and second pair of swinging arms, 26 and 30, are vertically shifted upward. This extra height is beneficial in lifting an implement to a sufficient height to be able to place it on or remove it from a transport truck or trailer. It should also be noted that the attached implement can be raised to a desired height without having the operator's view obstructed by either the guide tracks 18 or the support members 20, since they are contained within the confines of the hood 12.

As shown in FIGS. 1–6, the attachment device 16 includes a locking mechanism 48 which is attached to an upper end of at least one of the guide tracks 18. The locking mechanism 48 includes a movable catch 50 which is biased by a spring 52 to a blocking position to prevent upward movement of the support members 20 within the guide tracks 18. The locking mechanism 48 can be manually operated by a cable 54 which leads into the cab of the vehicle 10. The catch 50 is disengaged when the operator of the vehicle 10 pulls on the cable 54. By so doing, the catch 50 is moved in a direction causing the spring 52 to compress and permitting upward movement of the support members 20 within the guide tracks 18. Although the locking mechanism 48 has been described in respect to one particular embodiment, it will be apparent to those skilled in the art that other arrangements are possible, including the use of mechanical, electrical or hydraulic actuation.

Figure 10:
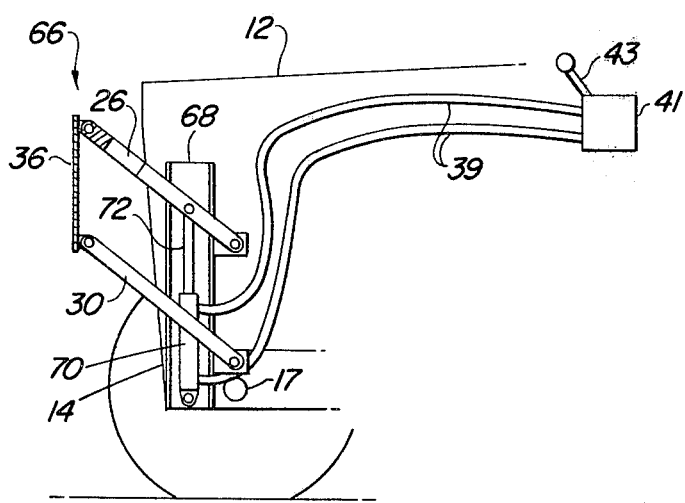
FIG. 10 is a side view similar to FIG. 9 showing the swinging arms in a raised position.

Referring to FIGS. 7-10, a second embodiment of an attachment device 66 is shown for mounting an implement onto the front of a motor vehicle 10. The attachment device 66 differs from that shown in FIGS. 1-6 in that a pair of support members 68 are fastened directly to the frame of the vehicle 10, such as by welding, and the lifting elements 70 are single stage hydraulic cylinders. The attachment device 66 is also simplified in that it does not contain a stop member or a locking device. Other than the above mentioned differences, the attachment device 66 is similar in construction to that shown in the first embodiment and therefore similar numbers have been used for all similar parts. In FIG. 10, one will notice that upward movement of the first and second pairs of swinging arms, 26 and 30, is limited by the maximum movement of piston rods 72 outward from the hydraulic cylinder 70.

While the invention has been described in conjunction with two specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. An attachment device for attaching an implement to the front of a vehicle, said attachment device comprising:
   (a) a pair of spaced apart guide tracks fastened in a vertical fashion to frame members of said vehicle, said guide tracks aligned opposite and parallel to each other;
   (b) a pair of U-shaped beams vertically movable in said guide tracks, said open portion of said U-shaped beams facing each other;
   (c) first and second brackets fastened to each of said U-shaped beams, said brackets spaced vertically apart and extending rearward relative to the front of said vehicle;
   (d) a first pair of swinging arms joined together at a forward end and pivotally attached at rearward ends to said first brackets;
   (e) a second pair of swinging arms aligned parallel to said first pair of swinging arms and pivotally attached at rearward ends to said second brackets, said first and second pairs of swinging arms extending forward beyond the front of said vehicle for supporting an implement;
   (f) a pair of hydraulic cylinders, each pivotally attached at a first end to said vehicle frame and rotatably attached at a second end to one of said first pair of swinging arms; and
   (g) control means for actuating said hydraulic cylinders to raise and lower said implement relative to the ground.

2. The attachment device of claim 1 wherein said first and second pair of swinging arms are vertically shiftable relative to said vehicle frame.

3. The attachment device of claim 1 wherein said points of attaching said first and second pair of swinging arms to said first and second brackets are approximately vertically above the points where a pair of front axles are joined to said vehicle frame.

4. An attachment device for attaching an implement onto the front of a vehicle, said attachment device comprising:
   (a) a pair of spaced apart guide tracks fastened in a vertical fashion to frame members of said vehicle, said guide tracks aligned opposite and parallel to each other;
   (b) a pair of U-shaped beams vertically movable in said guide tracks, the open portion of said U-shaped beams facing each other;
   (c) a stirrup-shaped swinging arm having a pair of rearwardly extending legs attached to said pair of U-shaped beams;
   (d) a pair of forwardly extending swinging arms aligned vertically below said stirrup-shaped swinging arm, said pair of swinging arms being pivotally attached at rearward ends to said pair of U-shaped beams; and
   (e) lifting means for vertically moving said implement relative to the ground, said lifting means connecting said vehicle frame to at least one of said swinging arms.

5. The attachment device of claim 4 wherein said lifting means includes a hydraulic cylinder pivotally attached at a first end to said vehicle frame and attached at a second end to said stirrup-shaped swinging arm.

6. The attachment device of claim 5 wherein said hydraulic cylinder is positioned within one of said U-shaped beams.

7. The attachment device of claim 4 wherein said pair of swinging arms are attached to said U-shaped beams vertically above a front axle of said vehicle.

8. An attachment device for attaching an implement onto the front of a vehicle, said attachment device comprising:
   (a) a pair of spaced-apart guide tracks fastened in a vertical fashion to frame members of said vehicle, said guide tracks aligned opposite and parallel to each other;
   (b) a pair of support members movable in a vertical fashion within said pair of guide tracks;
   (c) a first swinging arm attached at a rearward end to at least one of said support members;
   (d) a pair of second swinging arms aligned approximately parallel to said first swinging arm, each of said second swinging arms pivotally attached at a rearward end to one of said support members below the point of attachment of said first swinging arm, all of said swinging arms extending forward beyond the front of said vehicle for supporting said implement; and
   (e) lifting means for adjusting the height of said implement relative to the ground, said lifting means connecting said first swinging arm to said frame members of said vehicle.

9. The attachment device of claim 8 wherein said lifting means includes a hydraulic cylinder pivotally attached at a first end to said frame member and attached at a second end to said first swinging arm.

10. The attachment device of claim 8 wherein said pair of swinging arms are attached to said support members vertically above a front axle of said vehicle.

11. The attachment device of claim 8 wherein said support members are U-shaped beams vertically movable in said pair of guide tracks, the open portion of said U-shaped beams facing each other.

12. The attachment device of claim 11 wherein said U-shaped beams accommodate and partially enclose said lifting means.

13. The attachment device of claim 8 wherein a locking device is positioned relative to at least one of said guide tracks for locking a support member in place.

14. The attachment device of claim 13 wherein said locking device includes a spring-loaded catch positioned above an upper end of one of said support members, said catch being movable between a locking position preventing movement of said support members within said guide tracks, and a non-locking position permitting movement of said support members within said guide tracks.

15. The attachment device of claim 8 wherein a stop member is attached to at least one of said support members for limiting pivotal upward movement of said first swinging arm relative to said support members.

16. An attachment device for attaching an implement to the front of a motor vehicle and being capable of adjusting the height of said implement relative to the ground, said attachment device comprising:
 (a) a pair of spaced-apart guide tracks fastened in a vertical fashion to frame members of said vehicle, said guide tracks aligned opposite and parallel to each other;
 (b) a pair of U-shaped beams vertically movable in said guide tracks, the open portion of said U-shaped beams facing each other;
 (c) a pair of support members movable in a verticle fashion within said pair of guide tracks;
 (d) a first pair of swinging arms joined together at a forward end and pivotally attached at rearward ends to said support members;
 (e) a second pair of swinging arms aligned approximately parallel to said first pair of swinging arms, each of said second swinging arms being pivotally attached at a rearward end to one of said support members below the points of attachment of said first pair of swinging arms, said first and second pairs of swinging arms extending forward beyond the front of said vehicle for supporting said implement;
 (f) lifting means for adjusting the height of said implement, said lifting means connecting said frame of said vehicle to said first pair of swinging arms; and
 (g) control means for actuating said lifting means to raise and lower said implement relative to the ground.

* * * * *